United States Patent
Shi et al.

(10) Patent No.: US 7,878,862 B2
(45) Date of Patent: Feb. 1, 2011

(54) ELECTRICAL CONNECTOR ROTATABLY MOUNTED TO A PORTABLE DEVICE

(75) Inventors: Hou-Yu Shi, Kunshan (CN); David Tso-Chin Ko, Fullerton, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/829,443

(22) Filed: Jul. 2, 2010

(65) Prior Publication Data

US 2011/0003508 A1     Jan. 6, 2011

(30) Foreign Application Priority Data

Jul. 2, 2009     (CN) .................. 2009 2 0305548

(51) Int. Cl.
*H01R 24/00* (2006.01)
*H01R 33/00* (2006.01)

(52) U.S. Cl. ............... 439/660; 439/76.1; 439/131; 439/607.36

(58) Field of Classification Search ............. 439/76.1, 439/660, 607.01, 131, 640, 607.23, 607.28, 439/607.31, 607.33, 607.34, 607.35, 607.36
See application file for complete search history.

(56) References Cited

U.S. PATENT DOCUMENTS

2009/0275235 A1* 11/2009 Shi et al. ............... 439/607.58

FOREIGN PATENT DOCUMENTS

CN    2738529     11/2005

* cited by examiner

*Primary Examiner*—Javaid Nasri
(74) *Attorney, Agent, or Firm*—Wei Te Chung; Andrew C. Cheng; Ming Chieh Chang

(57) ABSTRACT

An electrical connector (100), includes an insulative housing (10), a plurality of conductive contacts (20) retained in the insulative housing, an insulative base (60) secured to the insulative housing, a subsidiary printed circuit board (30) connecting with the conductive contacts, a flexible printed circuit board (50) electrically connecting with the subsidiary printed circuit board, and a shielding shell (70) shielding peripherally around the insulative housing and the insulative base. The subsidiary printed circuit board is attached to the insulative base. A gap (609) is defined between a portion of the insulative base and an edge of the subsidiary printed circuit board. The flexible printed circuit board has a first strip portion (503) extending out of the insulative base, a second strip portion (501) connecting with the subsidiary printed circuit board, and a folded portion (505) between the two strip portions. The folded portion is received in the gap.

16 Claims, 5 Drawing Sheets

US 7,878,862 B2

ELECTRICAL CONNECTOR ROTATABLY MOUNTED TO A PORTABLE DEVICE

BACKGROUND OF THE INVENTION

1. Field of the Invention

The present invention relates generally to an electrical connector, and more particularly to an electrical connector rotatable relative to a portable device which the electrical connector is assembled to.

2. Description of Related Arts

A portable device with memory function is widely used today, such as a MP3, a digital camera, a mobile phone, etc. A user usually needs a data cable having two I/O ports for connecting the portable device to a computer. A USB cable having two USB connecting ports is very popular to the users. One of the USB connecting ports is connected to the portable device and the other one is connected to the computer such that signals are transferred between the portable device and the computer. Accompanying with development of technology, other kinds of data cables with different I/O ports are invented. Accordingly, a suited data cable is usually required. However, having both a portable device and a suited data cable separated from the portable device is troublesome.

Hence, an electrical connector built in the portable device emerges. Chinese Patent No. 2738529 discloses such kind of a portable device having an electrical connector which is received in the portable device when not in use and is rotatable with respect to the portable device when in use, being exposed out of the portable device for connecting to a computer. The electrical connector comprises an insulative housing, a plurality of contacts received in the insulative housing, and a plurality of wires connecting to the contacts. The wires are soldered to a printed circuit board (PCB) of the portable device for electrical connection. The electrical connector rotates out of the portable device and drags the wires, which may cause damage to the connection between the wires and the PCB.

Hence, an electrical connector built in a portable device, rotatable relative to the portable device, and preventing damage to the connection between the wires and the PCB, is desired.

SUMMARY OF THE INVENTION

Accordingly, an object of the present invention is to provide an electrical connector built in a portable device, rotatable relative to the portable device, and preventing damage to the connection between the wires and the PCB.

To achieve the above object, an electrical connector includes an insulative housing, a plurality of conductive contacts retained in the insulative housing, an insulative base secured to the insulative housing, a subsidiary printed circuit board connecting with the conductive contacts, a flexible printed circuit board electrically connecting with the subsidiary printed circuit board, and a shielding shell shielding peripherally around the insulative housing and the insulative base. The subsidiary printed circuit board is attached to the insulative base. A gap is defined between a portion of the insulative base and an edge of the subsidiary printed circuit board. The flexible printed circuit board has a first strip portion extending out of the insulative base, a second strip portion connecting with the subsidiary printed circuit board, and a folded portion between the two strip portions. The folded portion is received in the gap.

Other objects, advantages and novel features of the invention will become more apparent from the following detailed description when taken in conjunction with the accompanying drawings.

DETAILED DESCRIPTION OF THE PREFERRED EMBODIMENT

Figure 1:
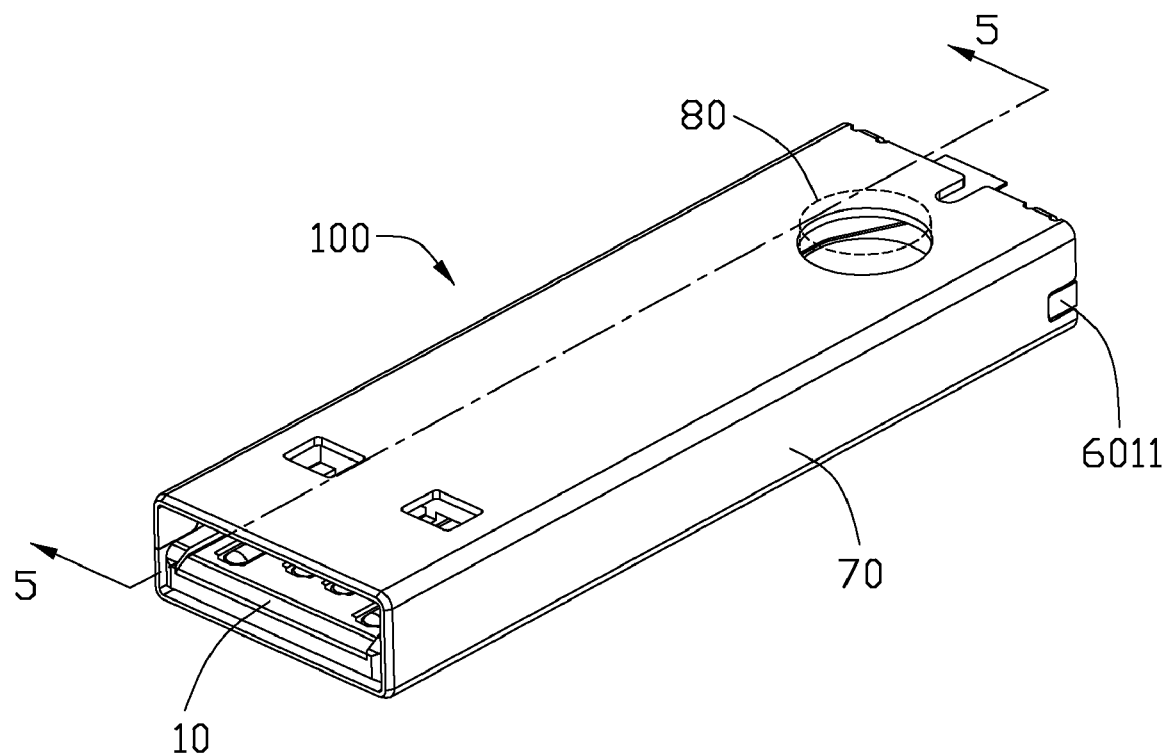
FIG. 1 is a perspective, assembled view of an electrical connector constructed in accordance with the present invention.

Referring to FIGS. 1-5, an electrical connector 100 of the present invention is used for transmitting signals between a portable device (such as a mobile phone, not shown) and an outer appliance (such as a computer, not shown). The electrical connector 100 comprises an insulative housing 10, a plurality of conductive contacts 20 retained in the insulative housing 10, a subsidiary printed circuit board 30 connecting with the conductive contacts 20, a flexible printed circuit board 50 electrically connecting with the subsidiary printed circuit board 30 and a mother printed circuit board (not shown) of the portable device, an insulative base 60, and a shielding shell 70 shielding peripherally. The electrical connector 100 is rotatably mounted to the portable device due to an axle element 80, which is formed on the portable device.

Figure 4:
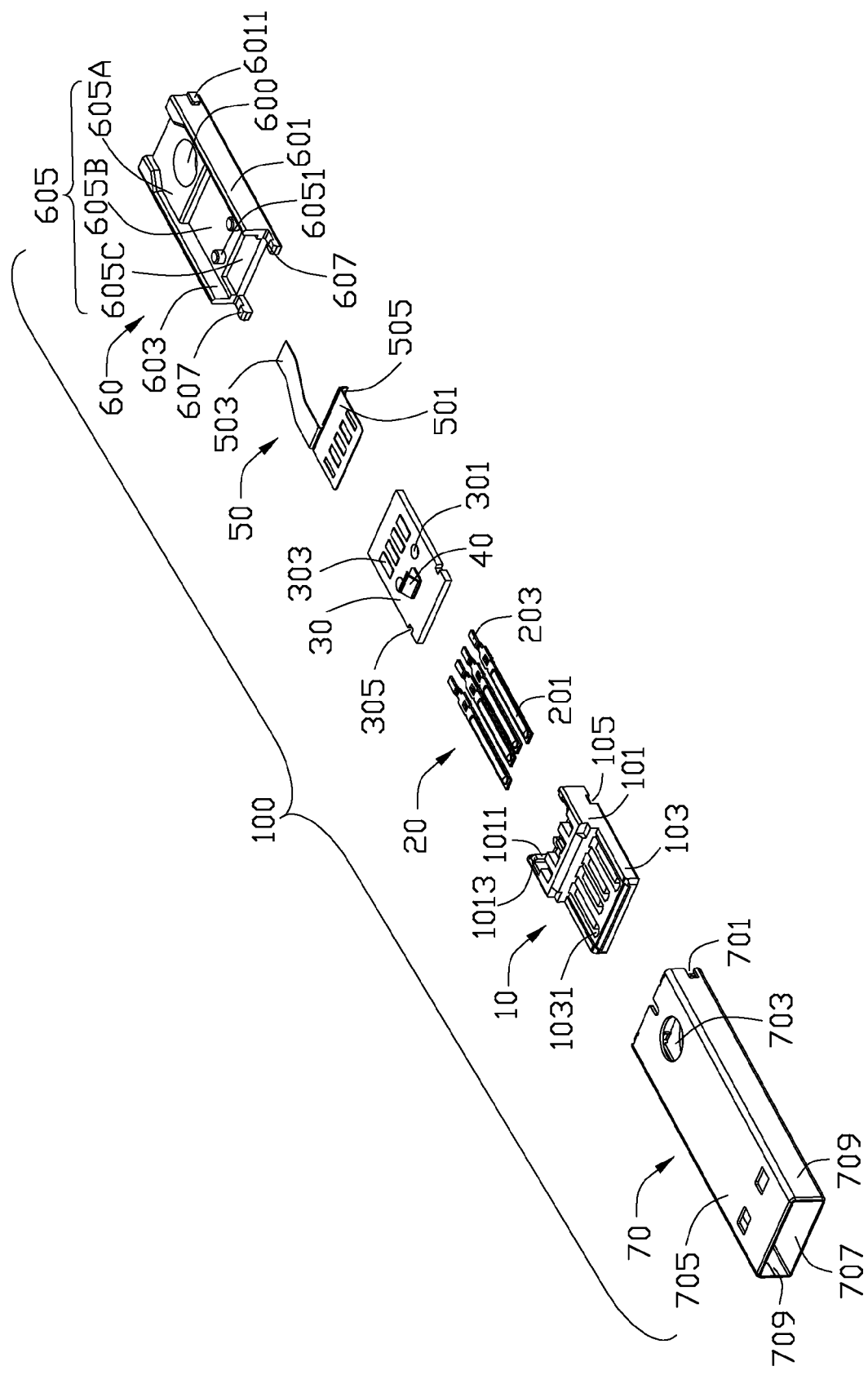
FIG. 4 is a perspective, thorough exploded view of the electrical connector.

Referring to FIG. 4, the insulative housing 10 comprises a base portion 101 at a rear part thereof and a tongue portion 103 extending forward from the base portion 101 for inserting into a corresponding receptacle of the outer appliance. The tongue portion 103 defines a plurality of passageways 1031 from a top surface thereof. The passageways 1031 extends to the base portion 101. The base portion 101 comprises a pair of arm portions (not labeled) each defining a notch 105 therebelow. Each arm portion forms a rib 1011 from an inner surface thereof. Each rib 1011 has a guiding surface 1013 slantwise on an upper side thereof.

Figure 5:
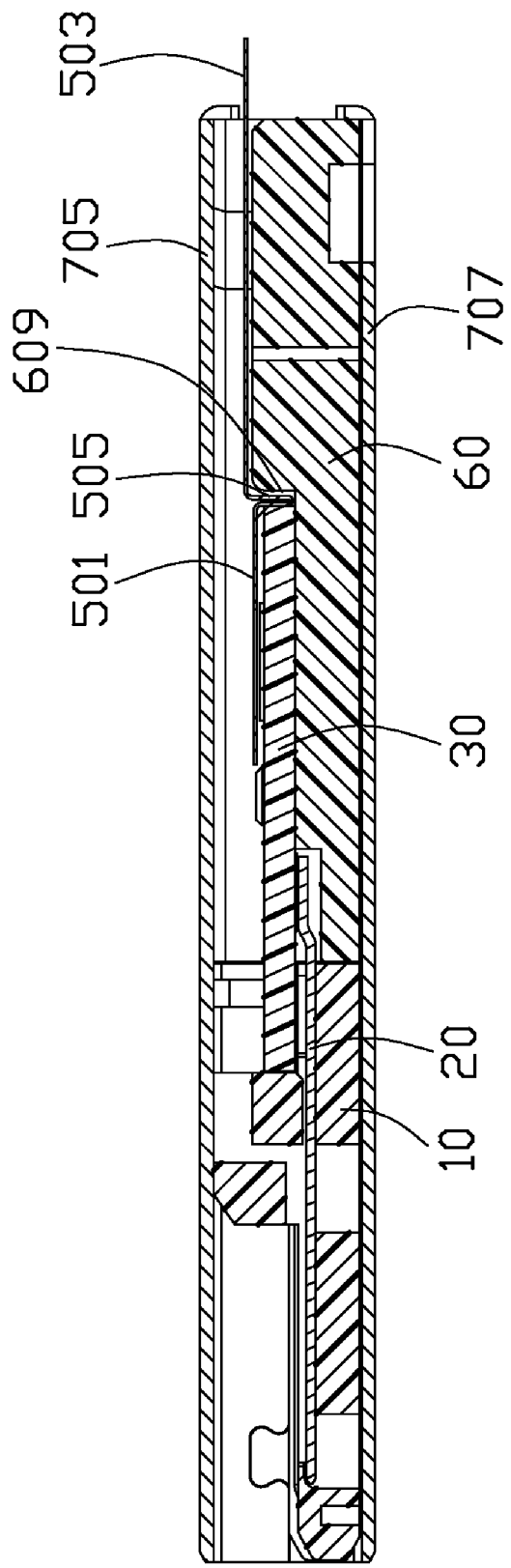
FIG. 5 is a cross-sectional view of the electrical connector taken along line A-A of FIG. 1.

Referring to FIGS. 4 and 5, the conductive contacts 20 are received in the passageways 1031 of the insulative housing 10. Each conductive contact 20 comprises a contacting portion 201 and a rear portion 203 extending rearward from the contacting portion 201. The contacting portion 201 partly extends beyond the tongue portion 103 for engagement. The rear portion 203 extends out of the base portion 101 to be soldered with the subsidiary printed circuit board 30.

Figure 3:
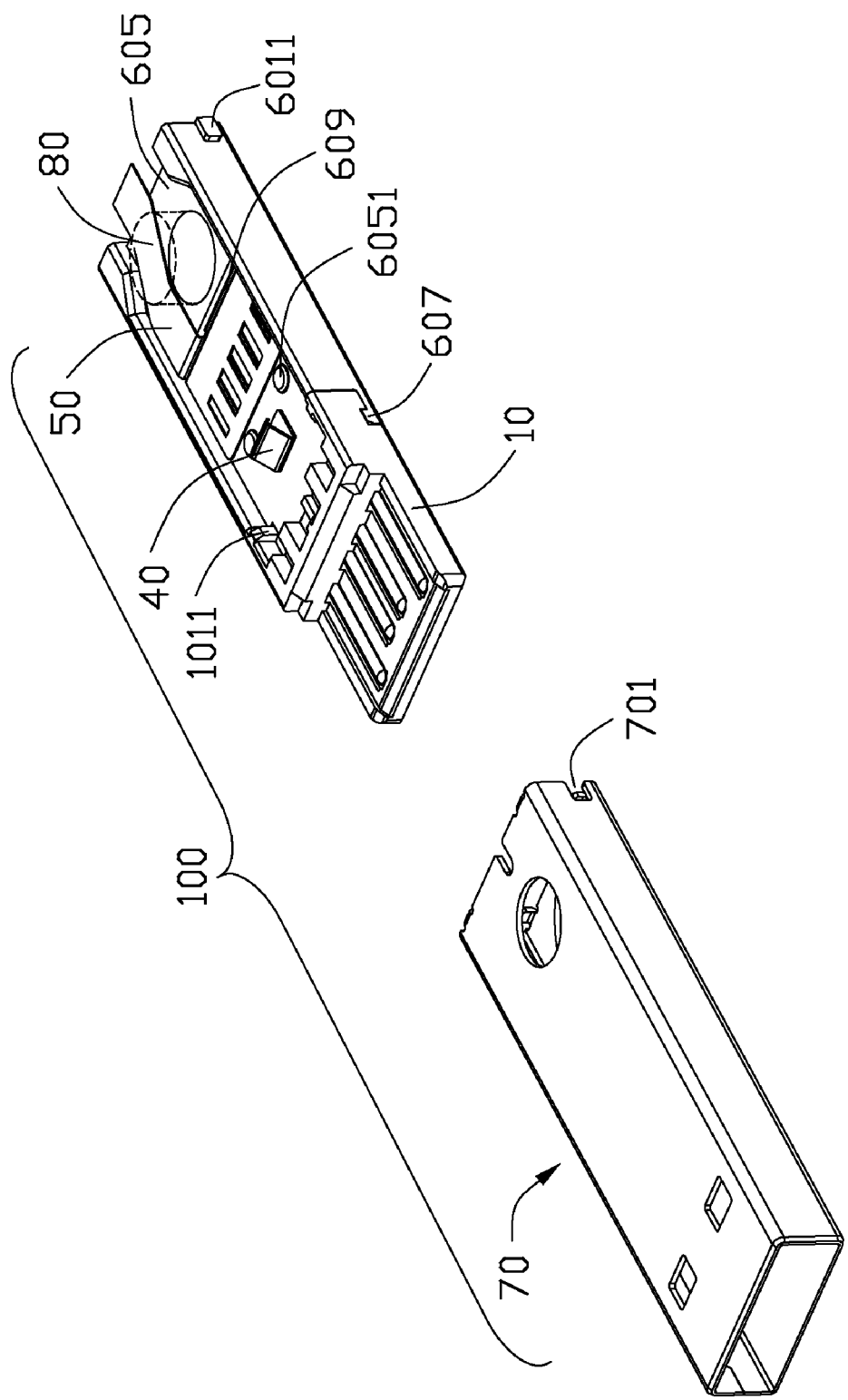
FIG. 3 is a perspective, partly exploded view of the electrical connector.

Referring to FIGS. 3 and 4, the subsidiary printed circuit board 30 is board configured. The subsidiary printed circuit board 30 is adhered with a plurality of conductive pads 303 on a lower surface thereof for connecting with the rear portions 203 of the conductive contacts 20, as well as a plurality of conductive pads 303 on an opposite upper surface thereof for connecting with the flexible printed circuit board 50. The subsidiary printed circuit board 30 defines a pair of round holes 301 extending through upper and lower surfaces thereof. The subsidiary printed circuit board 30 further defines a recess 305 at each side edge thereof. The recess 305 are located at a front part of the subsidiary printed circuit board 30, the conductive pads 303 are located at a rear part of the subsidiary printed circuit board 30, while the round holes 301 are arranged on a middle part of the subsidiary printed circuit board 30. The insulative housing 10 is successfully engaged with the subsidiary printed circuit board 30 during assembling the ribs 1011 into the recesses 305 due to guidance of the guiding surfaces 1013.

Referring to FIGS. 3-5, the flexible printed circuit board 50 has a first strip portion 503 extending out of the electrical connector 100 for connecting with the mother printed circuit board of the outer appliance, a second strip portion 501 connecting with the subsidiary printed circuit board 30, and a folded portion 505 connecting with the two strip portions 501, 503. The first strip portion 503 is narrower than the second strip portion 501. The folded portion 505 with one end connecting to the first strip portion 503 and the other end connecting to the second strip portion 501, keeps folded, vertical to the two strip portions 501, 503.

Referring to FIGS. 3-5, the insulative base 60 comprises a first lateral wall 601, a second lateral wall 603 locating opposite to the first lateral wall 601, and a floor portion 605 connecting with the two lateral walls 601, 603. Both the first lateral wall 601 and the second lateral wall 603 form block portions 6011. The floor portion 605 is further divided into three areas, respectively named a first floor portion 605A, a second floor portion 605B, and a third floor portion 605C. The first floor portion 605A, the second floor portion 605B, and the third floor portion 605C are stepped configured, with the first floor portion 605A higher than the second floor portion 605B and the second floor portion 605B higher than the third floor portion 605C. The first floor portion 605A defines a first aperture 600 for receiving the axle element 80 and accordingly, the insulative base 60 is fixed to the portable device thereby. The second floor portion 605B forms a pair of protrusions 6051 corresponding to the round holes 301 of the flexible circuit board 30 for retaining the flexible circuit board 30 on the second floor portion 605B. The insulative base 60 further forms a pair of locking arms 607 extending forwardly from the front edge of the lateral walls 601, 603.

Figure 2:
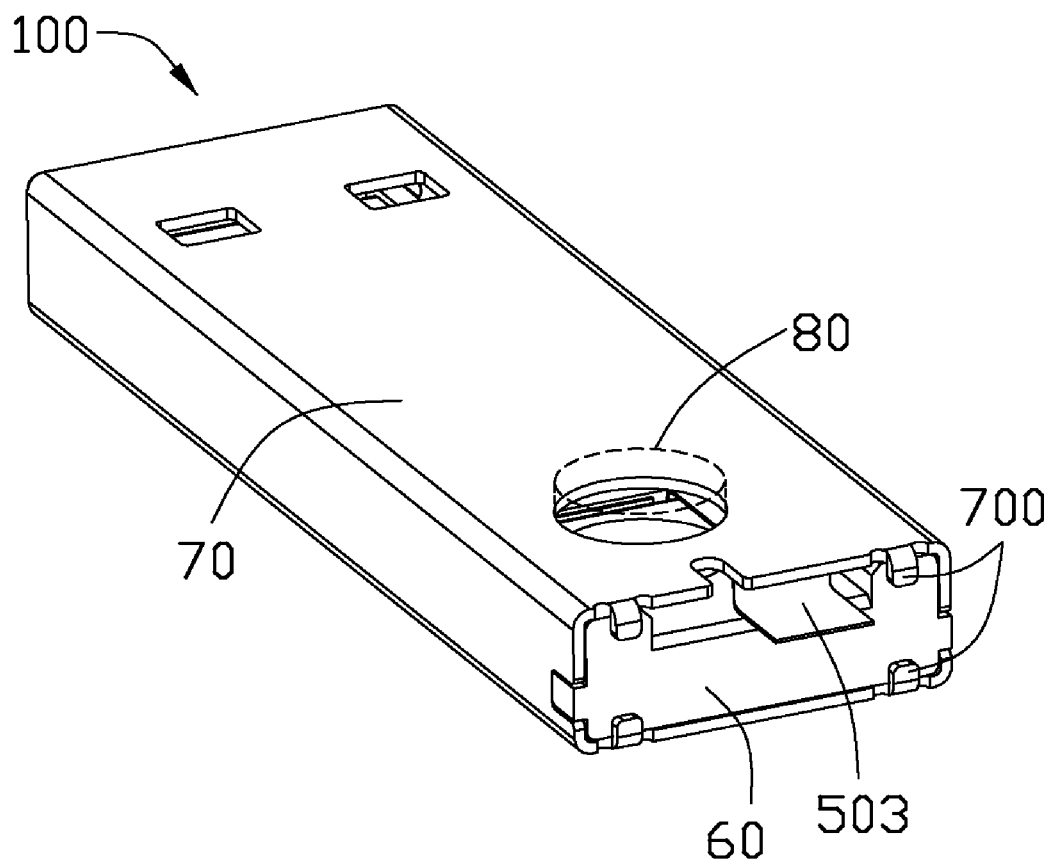
FIG. 2 is another perspective, assembled view of the electrical connector.

Referring to FIGS. 2 and 4, the shielding shell 70 is a box shaped without sealed at the front and rear ends. The shielding shell 70 comprises a top surface 705, a bottom surface 707, and a pair of vertical walls 709 connecting with the top surface 705 and the bottom surface 707. The top surface 705 and the bottom surface 707 define a pair of second apertures 703, echoing to the first aperture 600 of the insulative base 60 along an axis direction for the axle element 80 extending therethrough. The shielding shell 70 comprises two pairs of hook portions 700 at rear ends of the top and the bottom surfaces 705, 707 for bearing against a rear part of the insulative base 60. The shielding shell 70 defines a slit 701 at the rear end of each vertical wall 709, respectively receiving the corresponding block portion 6011 of the insulative base 60.

Referring to FIG. 4, a grounding pad 40 made from metallic material is connected on the subsidiary printed circuit board 30. When assembling, the grounding pad 40 contacts with the top surface 705 of the shielding shell 70 for grounding purpose.

Referring to FIGS. 1-5, in assembly, the insulative base 60 is secured to the insulative housing 10 in such a manner that the locking arms 607 of the insulative base 60 engages with the notches 105 of the insulative housing 10. The arm portions of the base portion 101 are respectively aligned with the lateral walls 601, 603 of the insulative base 60. The base portion 101 is sandwiched between the locking arms 607 of the insulative base 60. The rear portions 203 of the conductive contacts 20, which extend out of the base portion 101, are filled in the third floor portion 605C. The total height of the rear portions 203 and the third floor portions 605C is equal to the height of the second floor portion 605B. The subsidiary printed circuit board 30, which is secured to the base portion 101 of the insulative housing 10, is filled in the second floor portion 605B. The total height of the subsidiary printed circuit board 30 and the second floor portion 605B is equal to the height of the first floor portion 605A. The height of the lateral walls 601, 603 of the insulative base 60 is even higher than the first floor portion 605A such that the lateral walls 601, 603 cooperatively defines a receiving room (not labeled). The flexible printed circuit board 50 is attached to the subsidiary printed circuit board 30 and is received in the receiving room. The second strip portion 501 is overlapped on the subsidiary printed circuit board 30, while the second strip portion 503 is overlapped on the first floor portion 605A. The second strip portion 503 detours the first aperture 600 to extend out of the insulative base 60 for connecting with the mother printed circuit board. The subsidiary printed circuit board 30 and the first floor portion 605A defines a gap 609 and the folded portion 505 is received in the gap 609.

When the electrical connector 100 is an initial state, it is wholly hidden in the portable device. When the electrical connector 100 is in use, a user operates on the electrical connector 100 to make it rotate out of the portable device, during which the folded portion 505 received in the gap 609 is dragged from the gap 609 and becomes portion of the first strip portion 503, such that strength generated to the connection between the first strip portion 503 and the mother printed circuit board is released. Of course, when the electrical connector 100 renews to be received in the portable device, the first strip portion 503 retracts automatically into the gap 609 and becomes portion of the folded portion 505. Emphatically speaking, the first strip portion 503 is long enough to make sure that the folded portion 505 is not wholly dragged out of the gap 609 even if the electrical connector 100 rotates across a maximal angle (preferably)90°. What mentioned above is very important to make sure the first strip portion 503's automatic retraction into the gap 609.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical connector for being rotatably mounted relative to a portable device, comprising:
an insulative housing;
a plurality of conductive contacts retained in the insulative housing;
an insulative base secured to the insulative housing;
a subsidiary printed circuit board connecting with the conductive contacts, the subsidiary printed circuit board attached to the insulative base, a gap defined between a portion of the insulative base and an edge of the subsidiary printed circuit board;
a flexible printed circuit board having a first strip portion extending out of the insulative base, a second strip portion connecting with the subsidiary printed circuit board, and a folded portion between the two strip portions and received in the gap; and
a shielding shell shielding peripherally around the insulative housing and the insulative base.

2. The electrical connector as described in claim 1, wherein the folded portion is dragged from the gap and becomes portion of the first strip portion when the electrical connector is in use.

3. The electrical connector as described in claim 2, wherein the first strip portion retracts into the gap and becomes portion of the folded portion when the electrical connector is not in use.

4. The electrical connector as described in claim 1, wherein the insulative base comprises stepped first floor portion, second floor portion, and third floor portion.

5. The electrical connector as described in claim 4, wherein the first floor portion is higher than the second floor portion and the second floor portion is higher than the third floor portion.

6. The electrical connector as described in claim 5, wherein the subsidiary printed circuit board is secured to the second floor portion, and the total height of the subsidiary printed circuit board and the second floor portion is equal to the height of the first floor portion.

7. The electrical connector as described in claim 6, wherein the second floor portion forms at least one protrusion and the subsidiary printed circuit board defines at least one hole correspondingly receiving the at least one protrusion.

8. The electrical connector as described in claim 5, wherein each conductive contact comprises a contacting portion extending beyond the insulative housing and a rear portion extending out of the insulative housing and assembling to the third floor portion.

9. The electrical connector as described in claim 8, wherein a total height of the rear portions and the third floor portion is equal to the height of the second floor portion.

10. The electrical connector as described in claim 4, wherein the first floor portion defines a first aperture and the shielding shell defines a pair of second apertures on top and bottom surfaces thereof, echoing to the first aperture along an axis direction.

11. The electrical connector as described in claim 10, wherein the first strip portion detours the first aperture.

12. The electrical connector as described in claim 1, further comprising a grounding pad attached to the subsidiary printed circuit board and contacting with the shielding shell for grounding.

13. The electrical connector as described in claim 1, wherein the insulative housing forms a plurality of hook portions bearing against a rear part of the insulative base.

14. An electrical connector assembly comprising:
an electrical connector comprising:
an insulative housing;
a plurality of conductive contacts retained in the insulative housing;
an insulative base secured to the insulative housing, the insulative base defining a first aperture;
a subsidiary printed circuit board connecting with the conductive contacts, the subsidiary printed circuit board attached to the insulative base, a gap defined between a portion of the insulative base and an edge of the subsidiary printed circuit board;
a flexible printed circuit board having a first strip portion extending out of the insulative base, a second strip portion connecting with the subsidiary printed circuit board, and a folded portion between the two strip portions and received in the gap; and
a shielding shell shielding peripherally around the insulative housing and the insulative base, the shielding shell defining a second aperture echoing to the first aperture; and
a portable device having an axle element extending through the first and second apertures to fix with the insulative base; wherein
the electrical connector rotates relative to the portable device due to the axle element such that the electrical connector is exposed out of the portable device for connecting with a mating connector.

15. An electrical connector for being rotatably mounted relative to a portable device, comprising:
an insulative housing;
a plurality of conductive contacts retained in the insulative housing;
an insulative base secured to the insulative housing;
a subsidiary printed circuit board connecting with the conductive contacts, the subsidiary printed circuit board attached to the insulative base, a gap defined between a portion of the insulative base and an edge of the subsidiary printed circuit board;
a flexible printed circuit board having a first strip portion extending out of the insulative base, a second strip portion connecting with the subsidiary printed circuit board, and a folded portion between the two strip portions and received in the gap; and
a pivotal axle defined in the base behind the gap.

16. The electrical connector as claimed in claim 15, wherein said first strip is narrowed than the second strip portion.

* * * * *